(12) United States Patent
van Haasteren

(10) Patent No.: US 6,807,336 B2
(45) Date of Patent: Oct. 19, 2004

(54) OPTICAL LENSES

(75) Inventor: Adrianus J. P. van Haasteren, Signature Park (SG)

(73) Assignee: Agilent Technologies, Inc., Palo Alto, CA (US)

( * ) Notice: Subject to any disclaimer, the term of this patent is extended or adjusted under 35 U.S.C. 154(b) by 172 days.

(21) Appl. No.: 10/292,870

(22) Filed: Nov. 12, 2002

(65) Prior Publication Data

US 2004/0091218 A1 May 13, 2004

(51) Int. Cl.$^7$ .............................. G02B 6/42; G02B 6/32
(52) U.S. Cl. .......................................... 385/33; 385/93
(58) Field of Search .............................. 385/33–35, 88, 385/92, 93; 359/708–710

(56) References Cited

U.S. PATENT DOCUMENTS

| | | | | |
|---|---|---|---|---|
| 4,961,622 A | * | 10/1990 | Gorman et al. ................ | 385/33 |
| 6,530,697 B1 | * | 3/2003 | Johnson et al. ................ | 385/88 |
| 2002/0075911 A1 | * | 6/2002 | Cham et al. ............ | 372/29.011 |

FOREIGN PATENT DOCUMENTS

| | | | | |
|---|---|---|---|---|
| GB | 2354839 A | | 4/2001 | |
| GB | 2370653 A | * | 7/2002 | ............ G02B/6/42 |
| WO | WO 01/67566 | | 9/2001 | |
| WO | WO 200205004 A2 | * | 1/2002 | ............ G02B/6/42 |

* cited by examiner

Primary Examiner—Hemang Sanghavi
Assistant Examiner—Omar Rojas

(57) ABSTRACT

An optical lens is described that couples laser light into an optical fiber, that launches light such that the center and core-cladding of the fiber is avoided, that prevents optical feedback to the laser light source, and that can be economically manufactured, either as singles or arrays, in high volume. The lens (10') has at least one end surface (25') of a shape that is the combination of a conic component, a spiral component and a cone component (55). The conic component can be one of hyperbolic, parabolic or spherical shape. The other end surface (30') is typically of a convex hyperbolic shape. The lens is provided in a housing or can be integrated with a housing having one end coupling for coupling to a laser source (15) and a further end coupling to receive and retain a free end of an optical fiber (20). The lens is fabricated by the steps of forming a mold having the negative shape of the lens, including a mold portion corresponding to an end surface of the lens and being the negative of the combination of a conic component, a spiral component and a cone component, and producing said lens by a flowable material applied to said mold.

14 Claims, 6 Drawing Sheets

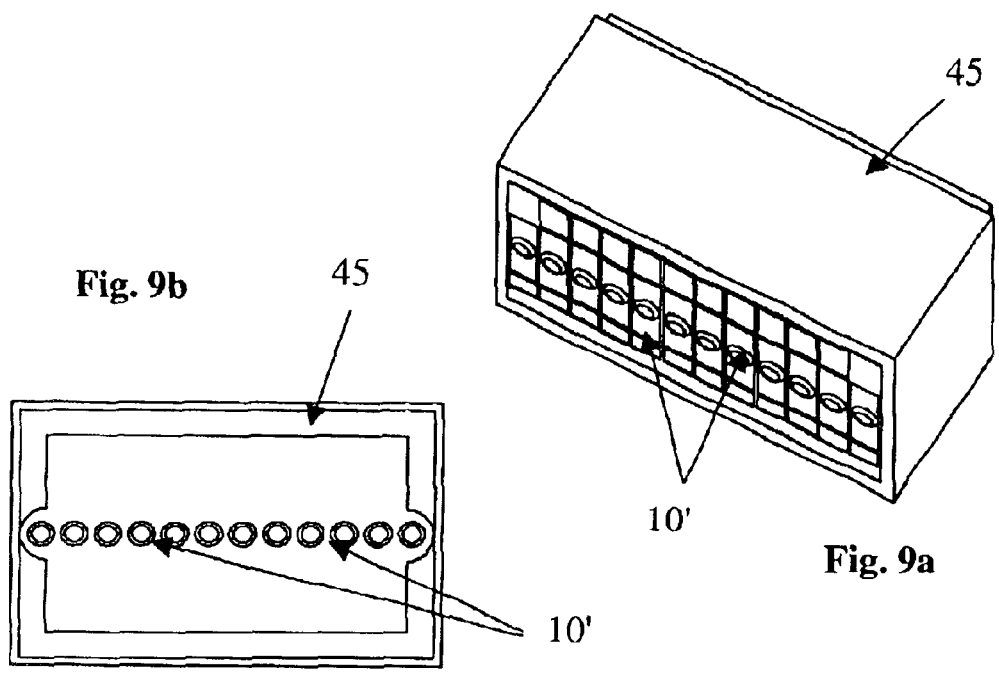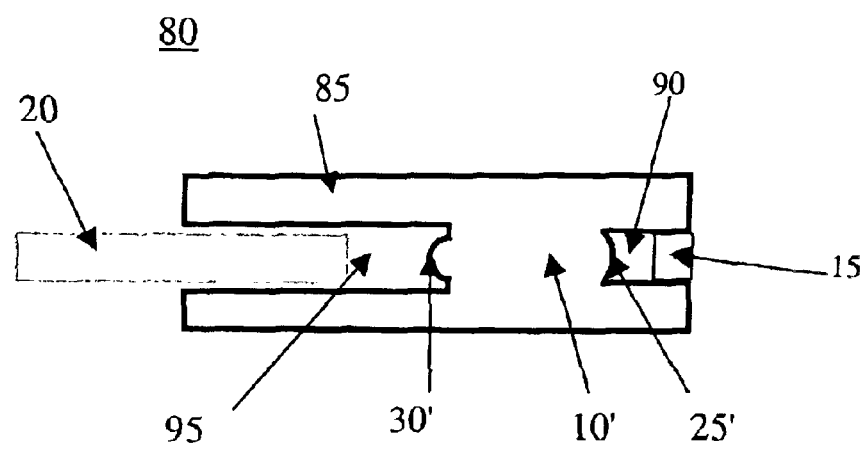

OPTICAL LENSES

FIELD OF THE INVENTION

The present invention lies in the field of micro-optical lenses as used in fiber optic data communication systems, whether singles or arrays, and particularly relates to inexpensive lenses that launch laser light into high-bandwidth optical fibers while reducing or eliminating feedback to the lasers.

BACKGROUND OF THE INVENTION

A typical known arrangement is shown in FIG. 1, wherein an optical lens 10 is interposed between a laser (i.e. coherent) light source 15 and the front-end of an optical fiber 20. The laser source 15 is mounted on for instance from a transistor outline (TO) header or a circuit board or 12 that covers the open end of a cavity 14. The lens 10 has an object (or input) surface 25 and an image (or output) surface 30. The lens 10 is held in optical alignment with the laser source 15 by a transistor outline (TO) can or a molding 16. FIG. 1 shows, by ray tracing, the typical path of light from the laser source 15 into the front-end 22 of the fiber 20. The optical fiber 20 also has a back-end 24 that connects with a receiver device 35.

There are a number of antagonistic design considerations relating to such lenses. This includes the situation that the volume of space within a package containing the laser, lens and fiber end is very small. Typically there is only 300 μm between the laser light source and the input surface of the lens in parallel optical channel applications. This places restrictions upon the lens design. Furthermore, such lens coupling units are often manufactured in an array (typically 12×1). The most significant objective in the design of such lenses is the avoidance of back reflections. Referring again to FIG. 1, conventional fiber surface 22 partially reflects the input laser light, which will then interfere with the source light 15 (and thus the data represented by the modulated light source) resulting in data errors at the far-end of the optical fiber. It is also possible for partial reflection to occur at the output surface 24, to be propagated back towards the laser light source 15 again leading to data corruption. A further requirement is that lens launches the laser light in the fiber while avoiding the refractive index anomalies in the fiber center as well as those at the core-cladding interface thus improving the bandwidth of the data communication.

One example in the prior art of an approach to the problem of partial reflections is described in British Patent Publication No. GB 2 354 839 A (Agilent Technologies Inc). This prior art document describes the toroidal lens surfaces as replacement for earlier hyperbolic transfer lenses.

It is further known to use sub-micron diffraction patterns (eg small ridges as a lens surface in an effort to reduce back reflections. These lens surfaces are produced by use of expensive sub-micron wafer technologies and these lenses attenuate the laser beam.

It is generally desirable to be able to injection mold micro lenses since that fabrication process is well suited for manufacturing at high volumes and low cost. The lenses are required to retain their shape at temperatures of 200° C. or above since laser transmitter/transceiver modules are exposed to high temperatures during their placement on PCB boards by a solder re-flow process or a solder bath. For this reason, only polymers with high glass transition temperatures can be used. However, the use of these types of polymer prevents the application of diffractive surfaces. Besides polymers, certain glass types can also be utilized, however this will significantly raise the price of the lens or lens array.

SUMMARY OF THE INVENTION

An optical lens that has at least one end surface of a surface shape that is the combination of a conic component, a spiral component and a cone component.

The lens can be arranged as an array. The lens or lens array can be integrated with a housing that has one end coupling for coupling to a laser source or laser sources and a further end for coupling to a free end of an optical fiber or fibers.

A method of fabricating the said optical lens involves forming a mold having the negative shape of the lens, including a mold portion corresponding to an end surface of the lens. The mold portion is the negative of the combination of a conic component, a spiral component and a cone component. The lens is produced by a flowable material applied to the mold.

BRIEF DESCRIPTION OF THE DRAWINGS

In the drawings:

FIGS. 9a and 9b show a lens array;

FIG. 10 shows a schematic form of an integrated coupler; and

DETAILED DESCRIPTION

In one embodiment, the input lens surface is fabricated to be of a shape that represents the geometrical combination of a conic, a spiral and a cone.

The following equation represents the conic component:

$$z = \frac{c(x^2 + y^2)}{1 + \sqrt{1 - (1+k)c^2(x^2 + y^2)}} \quad (1)$$

where:
  z: sag or z-coordinate of the surface;
  x, y: lateral coordinates;
  k: conic constant
  c: curvature (reciprocal of the surface's radius of curvature).

Figure 2:
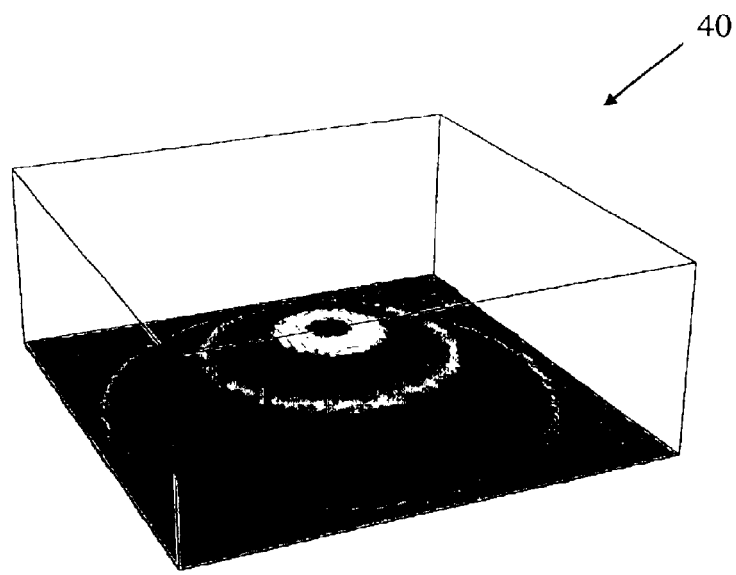
FIG. 2 is a perspective view of a conic surface of a lens.

FIG. 2 is an example of a conic shape 40 realised by this equation.

The following equation represents a cone:

$$z(x, y) = d\sqrt{x^2+y^2} \quad (2)$$

Here, z indicates the sag or z-coordinate of the surface, x and y represent again the lateral coordinates and d denotes a constant.

Figure 3:
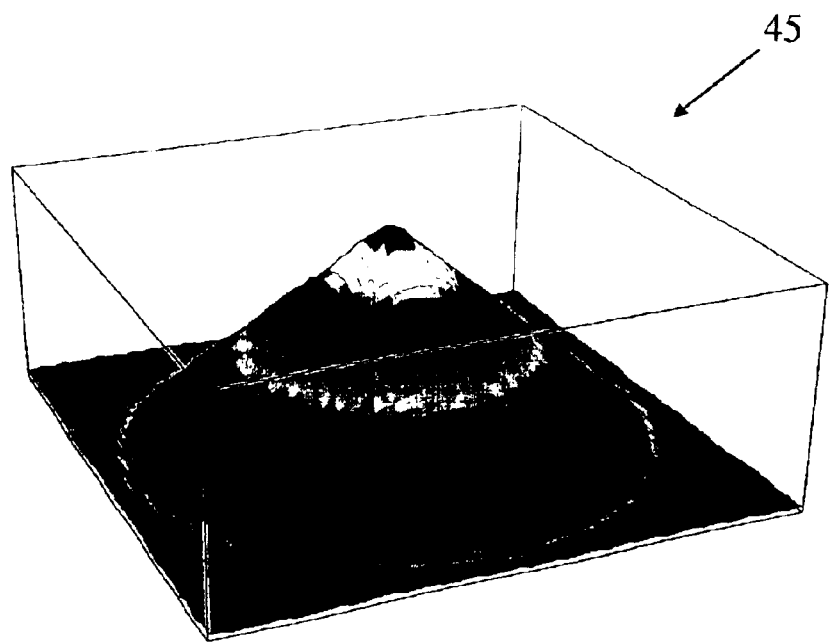
FIG. 3 is a perspective view of a cone surface of a lens.

FIG. 3 shows an example of a cone surface shape 45 realised by this equation.

The following paragraph represents the spiral component:

$$z(x, y) = u \arctan\left(\frac{y}{x}\right) \quad (3)$$

Here, z indicates the sag or z-coordinate of the surface, x and y represent lateral coordinates and u denotes a constant.

Figure 4:
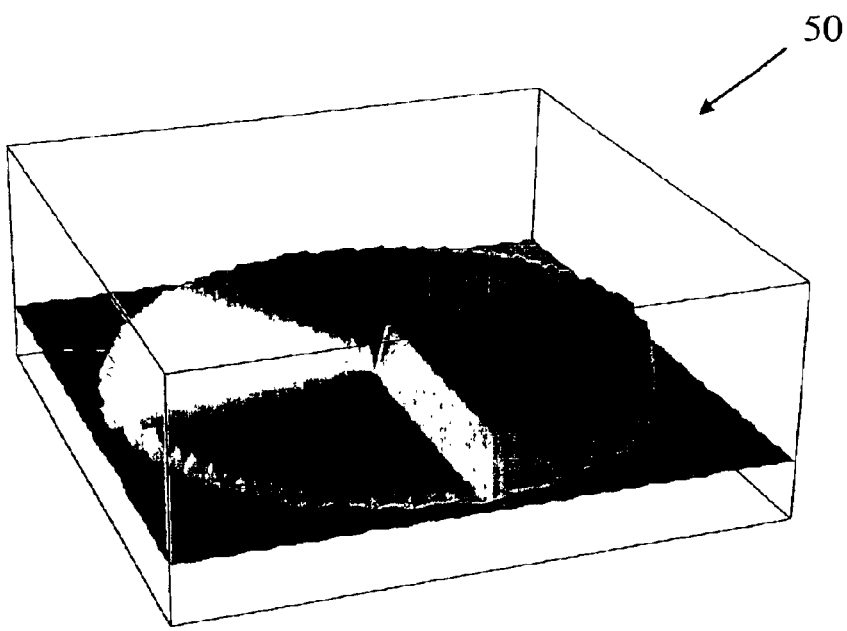
FIG. 4 is a perspective view of the spiral element of an end surface of a lens.

FIG. 4 shows an example of a spiral surface shape 50 realised by this equation.

Figure 5:
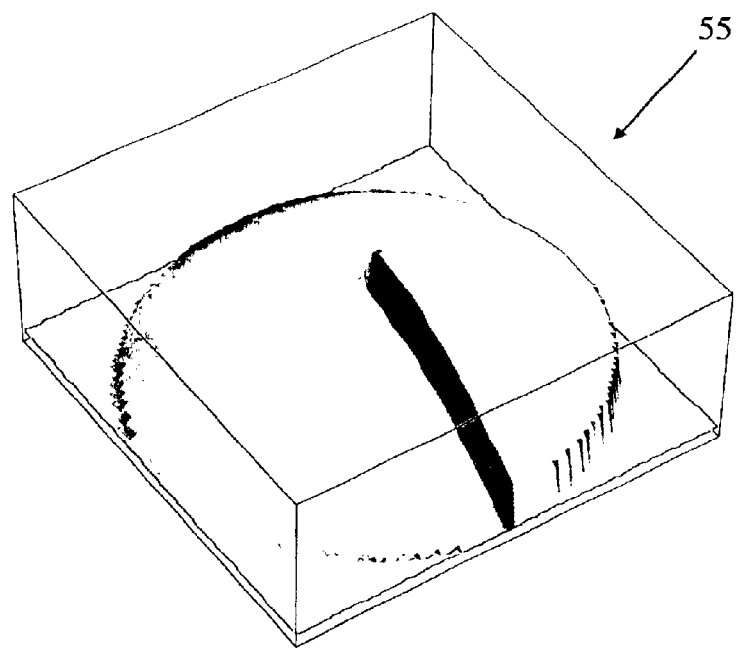
FIG. 5 is a perspective view of a lens end surface having conic, cone and spiral elements.

The composite end surface shape 55 is shown in FIG. 5, being the combination of the conic, spiral and cone surfaces. Such a shape is used for the object surface 25' of the lens, and may also by used at the image surface 30'.

Such a lens 10' serves two purposes. The first purpose is preventing the light that is reflected back towards the laser, for instance by front end surface 22 of the fiber, to reach the laser 15. Such back reflections have to be prevented because it will destabilize the laser and disturb the data recovery at the receiver side significantly. By use of lens 10', back reflections are reduced to typically −30 dB. The second purpose of the lens is to 'condition' the light spot on the face of the front fiber. This conditioned launch reduces the modal dispersion in a multi-mode fiber, thus increasing the fiber's data bandwidth. A task force of the Telecommunication Industry Association has specified a conditioned launch as a requisite for use of "High Bandwidth" fibers.

The ideal sag of the cone, spiral and conic depends on the characteristics of the laser, for example the mode profile and numerical aperture. Furthermore, the minimum coupled efficiency and accepted back reflection have to be taken into consideration. Finally, the laser-to-lens and lens-to-fiber distances have to be considered as well. The lens 10' can be applied in single-mode as well as multi-mode applications. For example, in multi-mode VCSEL applications a lens surface can be utilized which has a spiral component introducing a phase change of 6π over a 360° turn in combination with a cone component introducing a phase change of −4π when moving from the lens's circumference.

Specific Example

Figure 1:
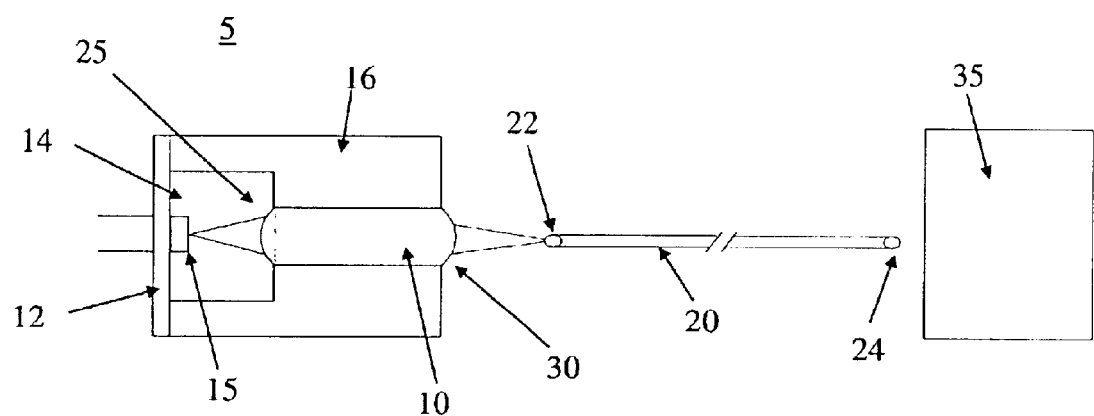
FIG. 1 shows a schematic diagram of a known generalised optical fiber/light source coupling arrangement.
Figure 6:
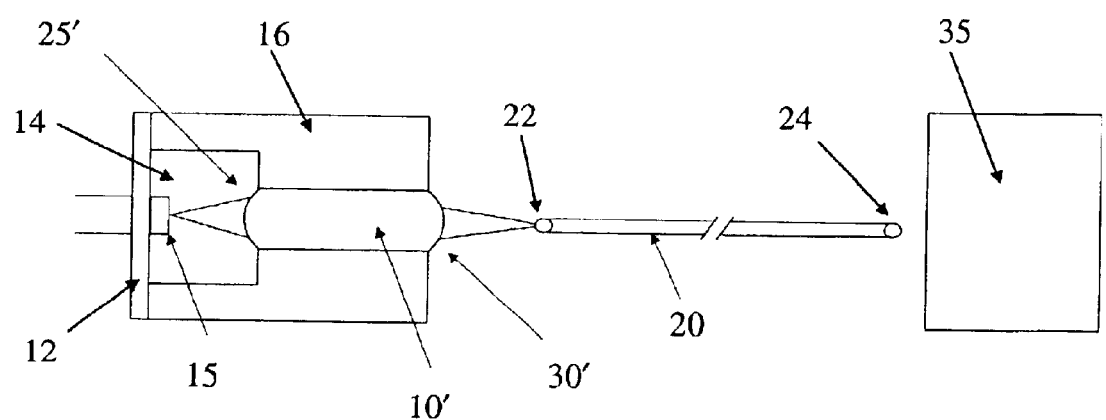
FIG. 6 shows an optical coupler integrated with a lens embodying the invention.

For the purposes of this description, reference can be made to FIG. 6, where a lens 10' which embodies the invention and which is integrated with a housing is used in place of the conventional lens 10 of FIG. 1.

In this example, the material from which the lens 10' is fabricated is "Ultem". Ultem exhibits a high transmission co-efficient at 850 nm and 1300 nm, making it a suitable material for use in transmitters, receivers and transceivers. It has a high glass transition temperature around 215° C., thus allowing the modules to be re-flowed.

The following equation expresses the convex input end surface 25' shape, which has a diameter of 250 μm:

$$z(x, y) = \frac{4.53(x^2 + y^2)}{1 + \sqrt{1 + 34.07(x^2 + y^2)}} + \left[6\pi \arctan\left[\frac{y}{x}\right] - \frac{4\pi\sqrt{(x^2+y^2)}}{125 \cdot 10^{-3}}\right]\frac{850 \cdot 10^{-6}}{2\pi \cdot 0.632} \quad (4)$$

The component shapes are recognisable from the generalised equations above as a conic, a spiral and a cone. The final multiplication factor is included to turn the phase surfaces' into an Ultem shape for a wavelength of 850 nm and contains a correction parameter in the denominator, which represents the (refractive index −1).

In this specific example it is chosen to implement the image (i.e. output) end surface 30' of the lens only as a convex hyperbolic surface.

$$z(x, y) = \frac{3.36(x^2 + y^2)}{1 + \sqrt{1 + 18.64(x^2 + y^2)}} \quad (5)$$

Here, the radius of curvature is 0.297 mm, and the conic constant is −2.65. The distance between the vertexes of the first and second surface has been chosen as 1.5 mm.

Figure 7:
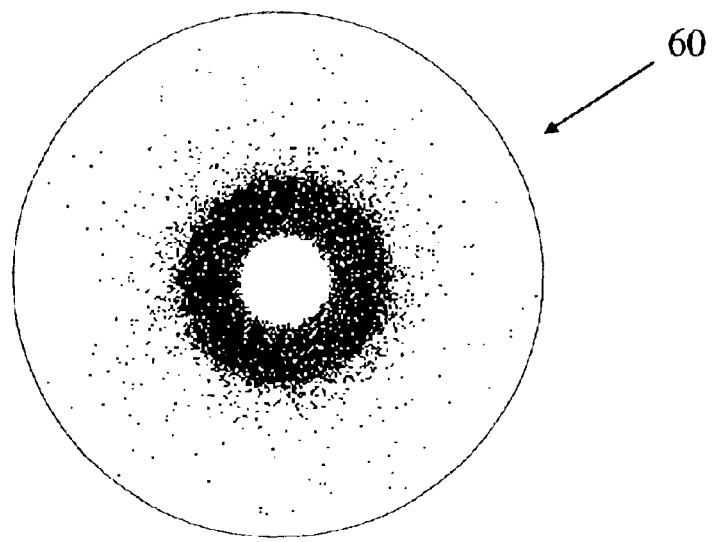
FIG. 7 shows the launch profile occurring at the optical fiber near-end face.

FIG. 7 shows the launch pattern 60 achieved by the lens 10' described above. As can be noted, an annular spread of light intensity is achieved.

Figure 8:
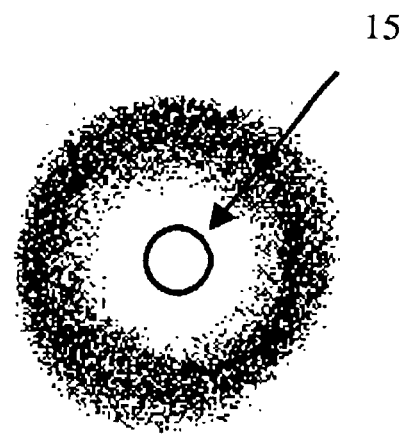
FIG. 8 is an image showing the back reflection from the lens.

FIG. 8 shows the back reflection 65 from the lens 10' and fiber 20 in combination, as it would be seen by the laser light source 15. As is apparent, that partial reflection does not impinge upon the light source, meaning that the occurrence of data errors is greatly reduced.

Method of Fabrication

Lenses of the generalised and specific forms described can be fabricated by injection molding. Polymer materials, various glass types or other materials with suitable optical qualities can be utilised. The molding cavity can be shaped by the use of a diamond turning process.

Lenses embodying the invention can be fabricated into array structures. FIGS. 9a and 9b show, in schematic form, a 12×1 array of lenses 10'.

FIG. 10 is a cross-sectional view of an optical coupler 80, that has a molding 85 integrated with a lens 10' as described, in alignment with an input aperture 80 and an output aperture 85. A laser light source 15 is securely mounted in the inlet aperture 90. In a similar manner, an optical fiber is received and secured in the outlet aperture 85. The laser 15, lens 10' and fiber 20 are held in correct optical alignment.

Figure 11:
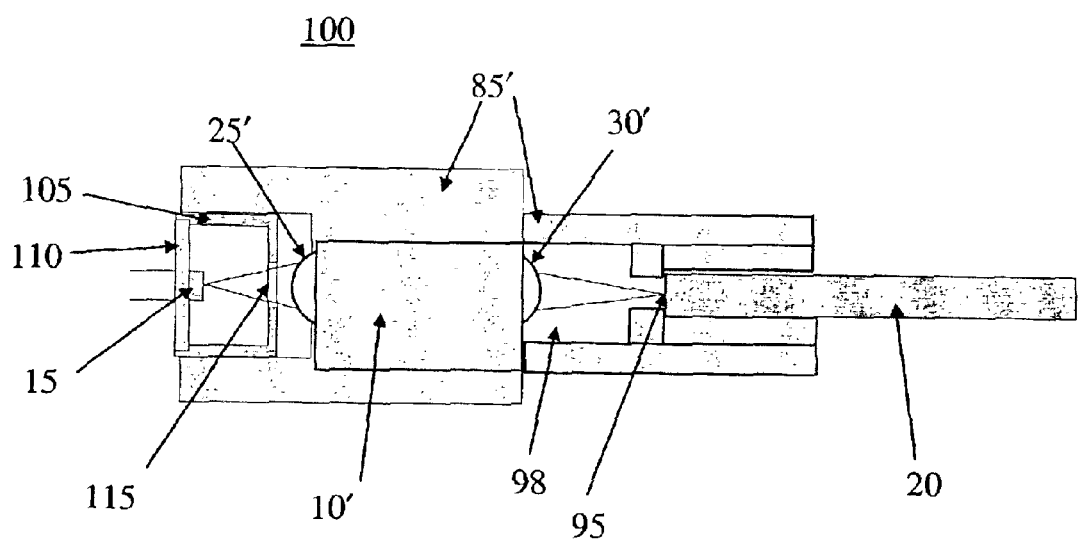
FIG. 11 shows a schematic form of another form of integrated coupler.

FIG. 11 shows, in cross-section, another form of optical coupler 100. This coupler differs from the arrangement of FIG. 9 in that a transistor outline package (often referred to as a TO Can) 105 is accommodated within the inlet aperture 90'. An optical fiber 20 is received in an output aperture 95, that opens to an outlet chamber 98, into which the image surface 30' projects. The input surface 25' of the lens 10' extends into a cavity 102. At the opening of the cavity 102, the laser source 15 is located, mounted from a TO header 105.

Fields of Application

Lenses and lens arrays constructed in accordance with the inventive concept can be applied in multi-mode and single mode optical data communication devices, like transmitters, transceivers and receivers.

Summary

The invention involves the realisation that directly molded basic shapes comprising a combination of a conic, a spiral and a cone shape, prevent back reflections from reaching the laser light source and focus the light from a laser into an annular shape, the core of the fiber not being illuminated. In comparison with prior art, the prevention of back reflected light to reach a laser is improved, coupling efficiency of the lens will be higher, the cost of the lens lower and design flexibility higher.

What is claimed is:

1. An optical coupler comprising:
    a housing having one end coupling for connection to a laser source and a further end connection to receive and retain a free end of an optical fiber; and an optical lens integrated within said housing that is in alignment with said laser source and said optical fiber free end, and wherein said lens includes a body portion of light transmissive material, and wherein at least the laser end surface shape of the lens is the combination of a conic component, a spiral component and a cone component,, and wherein the fiber end surface of the lens is a convex hyperbolic shape.

2. The optical coupler of claim 1, wherein said comic component is one of hyperbolic, parabolic or spherical.

3. The optical coupler of claim 2, wherein the maximum phase shifts introduced by the spiral component and the cone component have a ratio of −3:2.

4. The optical coupler of claim 2, fabricated from a moldable material.

5. The optical coupler of claim 1, wherein each of the conic spiral and cone components are mathematically characterised by a sag component, and said sag component is chosen to match at least the mode profile or the numerical aperture of a light source with which said lens will be used.

6. The optical coupler of claim 5, wherein said sag component is further dependent upon the respective distances between the lens and a light source, and the lens and a fiber with which the lens will be used.

7. The optical coupler of claim 1, wherein said laser is mounted on a Printed Circuit Board and/or flexible circuit tape.

8. An optical coupler comprising:

a housing having one end coupling for connection to an array of laser sources and a further end connection to receive and retain a free end of an array of optical fibers; and an optical lens array integrated within said housing that is in alignment with said laser array and said free ends of the optical fiber array, and wherein said lens array includes a body portion of light transmissive material, and wherein at least the laser end surface shape of the lenses in the array are the combination of a conic component, a spiral component and a cone component, and wherein the fiber end surfaces of the lenses in the lens array have a convex hyperbolic shape.

9. The optical coupler of claim 1, wherein said conic component is one of hyperbolic, parabolic or spherical.

10. The optical coupler of claim 9, wherein the maximum phase shifts introduced by the spiral component and the cone component have a ratio of −3:2.

11. The optical coupler of claim 10, fabricated from a moldable material.

12. The optical coupler of claim 1, wherein each of the conic, spiral and cone components are mathematically characterised by a sag component, and said sag component is chosen to match at least the mode profile or the numerical aperture of a light sources with which said lens array will be used.

13. The optical coupler of claim 12, wherein said sag component is further dependent upon the respective distances between the lens array and the laser array, and the lens array and the fiber array with which the lens array will be used.

14. The optical coupler of claim 8, wherein said laser array is mounted on a Printed Circuit Board and/or flexible circuit tape.

* * * * *